United States Patent
Hanwell et al.

(10) Patent No.: US 10,867,392 B2
(45) Date of Patent: Dec. 15, 2020

(54) SPATIALLY MULTIPLEXED EXPOSURE

(71) Applicant: Apical Limited, Cambridge (GB)

(72) Inventors: David Hanwell, Stapleford (GB); Alassane Seck, Cambridge (GB); Alex Kornienko, Loughborough (GB)

(73) Assignee: Apical Limited, Cambridge (GB)

( * ) Notice: Subject to any disclaimer, the term of this patent is extended or adjusted under 35 U.S.C. 154(b) by 104 days.

(21) Appl. No.: 16/150,884

(22) Filed: Oct. 3, 2018

(65) Prior Publication Data

US 2020/0111218 A1  Apr. 9, 2020

(51) Int. Cl.
*G06T 7/20* (2017.01)
*G06T 5/00* (2006.01)
(Continued)

(52) U.S. Cl.
CPC ............. *G06T 7/20* (2013.01); *G06T 3/4007* (2013.01); *G06T 5/002* (2013.01); *G06T 5/50* (2013.01);
(Continued)

(58) Field of Classification Search
CPC ............ H04N 5/2355; H04N 5/2353; H04N 5/23254; H04N 5/2356; H04N 5/35554; H04N 5/35563; H04N 5/35581; H04N 5/21; H04N 5/23229; H04N 5/23277; H04N 5/235; H04N 1/4074; H04N 1/409; H04N 5/144; H04N 5/145; H04N 5/213; H04N 5/2256; H04N 5/23232; H04N 5/23245; H04N 5/23264; G06T 5/50; G06T 5/002; G06T 2207/10016; G06T 2207/20182; G06T 2207/20221; G06T 2207/10144; G06T 2207/20208; G06T 5/003; G06T 11/60; G06T 2207/10004; G06T 2207/10024; G06T 2207/10056; G06T 2207/10064; G06T 2207/20021; G06T 2207/20048; G06T 2207/20201; G06T 3/40
See application file for complete search history.

(56) References Cited

U.S. PATENT DOCUMENTS

| | | | | |
|---|---|---|---|---|
| 2007/0047835 A1* | 3/2007 | Kondo | ................. | G06K 9/40 |
| | | | | 382/275 |
| 2013/0100314 A1* | 4/2013 | Li | ................. | H04N 5/2353 |
| | | | | 348/229.1 |

(Continued)

FOREIGN PATENT DOCUMENTS

EP    2523452 A1    11/2012
WO    2018136373 A1    7/2018

OTHER PUBLICATIONS

Combined Search and Examination Report dated Apr. 7, 2020 for UK Application No. GB1914253.8.

*Primary Examiner* — Golam Sorowar
(74) *Attorney, Agent, or Firm* — EIP US LLP

(57) ABSTRACT

Methods and apparatus for generating improved image data from received input image data comprising first input image data associated with a first exposure level and second input image data associated with a second, different, exposure level. Motion detection data is generated from the received input image data by applying a noise model and improved image data is generated by combining data from the first and second input data in dependence on the motion detection data.

15 Claims, 6 Drawing Sheets

(51) Int. Cl.
*G06T 3/40* (2006.01)
*G06T 7/13* (2017.01)
*G06T 5/50* (2006.01)
*G06T 7/30* (2017.01)

(52) U.S. Cl.
CPC .............. *G06T 7/13* (2017.01); *G06T 7/30* (2017.01); *G06T 2207/20224* (2013.01)

(56) References Cited

U.S. PATENT DOCUMENTS

2014/0205193 A1* 7/2014 Umezu ............... H04N 5/2355
    382/169
2017/0324909 A1* 11/2017 Choi ..................... G06T 7/11

* cited by examiner

SPATIALLY MULTIPLEXED EXPOSURE

BACKGROUND OF THE INVENTION

Field of the Invention

The present disclosure relates to methods and apparatus for processing image data.

Background

Image sensors for capturing images may be present in devices such as digital cameras, mobile phone cameras, and other image capture devices. Image sensors may be capable of capturing images with a smaller dynamic range than that perceivable by the human visual sensors. However, to increase the quality of images of high dynamic scenes, some image sensors can be used to capture high dynamic range (HDR) images. Image sensors can be used to capture high dynamic range images by capturing multiple images with different exposures and combining the images to generate an image having a higher dynamic range.

Images captured using a short exposure time, or with a low sensor sensitivity, may include detail in bright parts of a scene or in bright light conditions where using a longer exposure time, or a higher sensor sensitivity, would lead to saturation and a loss of detail but may lack detail in dark parts of a scene due to underexposure of the sensor pixels. Correspondingly images captured using a long exposure time, or a high sensor sensitivity, may include detail in dark parts of a scene or in dim light conditions where using a shorter exposure time, or a lower sensor sensitivity, would lead to underexposure but may lack detail in bright parts of a scene due to saturation of the sensor pixels. By combining images captured using different exposure times, or different sensitivity levels, it is possible to include detail in an image which may be lost when using a single exposure time or single sensitivity.

Some sensors use some sensor pixels to capture an image with a short exposure time and other sensor pixels to capture an image with a long exposure time. The two images are combined to generate a single image having a higher dynamic range than an equivalent image captured with a single exposure time. As each image uses a fraction of the sensor pixels to capture the respective image, interpolation is used to infer details at missing pixel positions.

It is desired to provide a method and system for use in combining image data generated using an image sensor having some pixels configured to capture an image using a different exposure time than other pixels.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

SUMMARY

Figure 1:
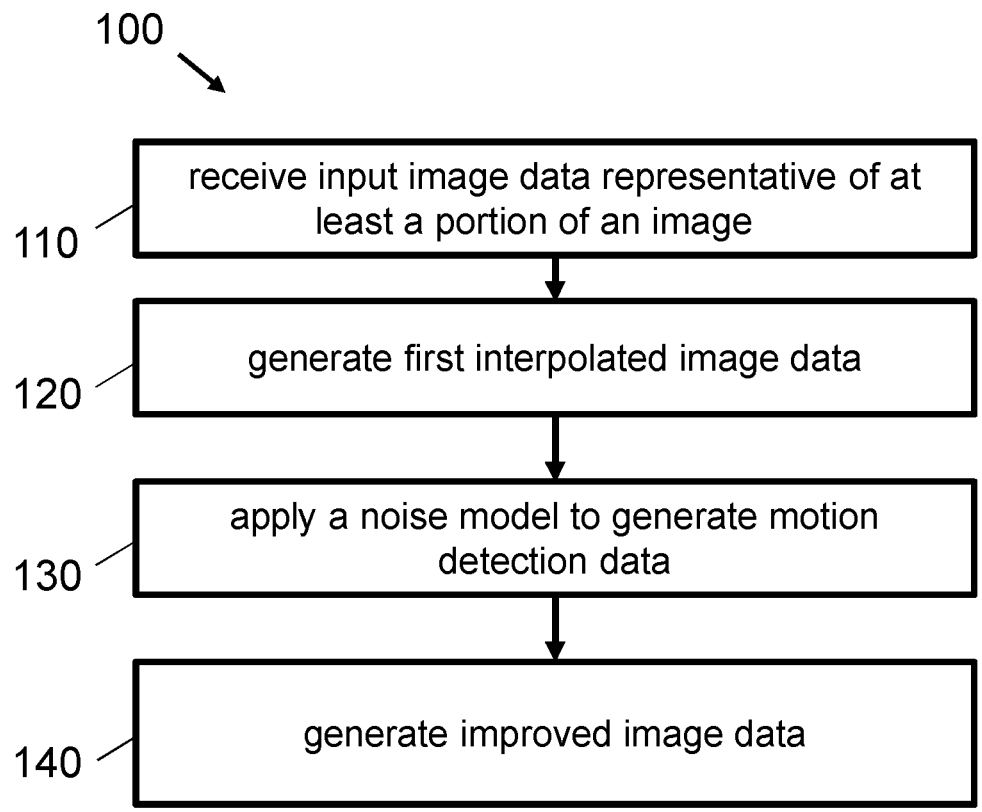
FIG. 1 is a flow chart of an example method.

In accordance with one aspect there is provided a method comprising: receiving input image data representative of at least a portion of an image, the input image data comprising first input image data representing a first set of pixel locations associated with a first exposure level and second input image data representing a second set of pixel locations associated with a second, different, exposure level; generating first interpolated image data associated with the first exposure level, the first interpolated image data comprising pixel intensity values for pixel locations in the second set; applying a noise model to generate motion detection data based on differences between the second input image data and the first interpolated image data; and generating improved image data by combining data from the received first and second input image data in dependence on the motion detection data.

In accordance with another aspect there is provided an apparatus comprising: at least one processor; at least one memory including computer program code, the at least one memory and the computer program code being configured to, with the at least one processor, cause the apparatus at least to: receive input image data representative of at least a portion of an image, the input image data comprising first input image data representing a first set of pixel locations associated with a first exposure level and second input image data representing a second set of pixel locations associated with a second, different, exposure level; generate first interpolated image data associated with the first exposure level, the first interpolated image data comprising pixel intensity values for pixel locations in the second set; applying a noise model to generate motion detection data based on differences between the second input image data and the first interpolated image data; and generate improved image data by combining data from the received first and second input image data in dependence on the motion detection data.

In accordance with another aspect there is provided a non-transitory computer-readable storage medium comprising computer-executable instructions which when executed by a processor cause operation of an image processing system to: receive input image data representative of at least a portion of an image, the input image data comprising first input image data representing a first set of pixel locations associated with a first exposure level and second input image data representing a second set of pixel locations associated with a second, different, exposure level; generate first interpolated image data associated with the first exposure level, the first interpolated image data comprising pixel intensity values for pixel locations in the second set; applying a noise model to generate motion detection data based on differences between the second input image data and the first interpolated image data; and generate improved image data by combining data from the received first and second input image data in dependence on the motion detection data.

DETAILED DESCRIPTION OF CERTAIN INVENTIVE EMBODIMENTS

Details of examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

FIG. 1 shows a flow chart 100 of a method of processing image data according to examples. The input image data is representative of at least a portion of an image. At a block 110, the method comprises receiving the input image data. The input image data may be captured by a remote image sensor and transmitted to be received. For example, a remote imaging device such as a camera or a smart telephone may capture image data using an image sensor and may transmit the image data over a wide area network, for example, the internet, via a network interface. In some examples, the image data may be received from a local imaging sensor. In other examples, the image data is received from storage. Image sensors used to capture image data may comprise an array of sensor pixels, which may be any suitable photosensors used for capturing images. For example, a sensor pixel may include a photosensitive element such as a photodiode that can convert incident light into electronic signals or data. Examples of components which may be used as sensor pixels include charged-coupled devices (CCDs) or complementary metal-oxide semiconductors (CMOSs). An exposure level may determine the time period over which light is captured by each sensor pixel of the image sensor and/or the gain applied by an amplifier to the electrical signal generated by each sensor pixel. The sensitivity of an image sensor to incident light when capturing an image is therefore generally determined by the exposure level. In the example of FIG. 1 the input image data comprises first input image data representing a first set of pixel locations associated with a first exposure level and second input image data representing a second set of pixel locations associated with a second, different, exposure level. This may be achieved, for example, by using a multi-exposure image sensor. The first and the second set of pixel locations may be arranged in a number of ways, specific examples of the arrangements of the first and second set of pixel locations will be discussed later with reference to other Figures. In some examples, image data representing the first and second set of pixel locations is generated by capturing light using different exposure times. For example, image data representing the first set of pixel locations may be generated by capturing light during a first time period and image data representing the second set of pixel locations may be generated by capturing light during a second, different, time period. Generating the image data representing the first and second set of pixel locations may commence at the same time and the image data representing the second set of pixel locations may be generated before the image data representing the first set of pixel locations is generated. In another example, generating the image data representing the first and second set of pixels may begin at different times such that the ends of the first and second time period occur simultaneously. In some examples, the input image data may comprise the first input image data, the second input image data, and third input image data representing a third set of pixel locations, associated with a third, different, exposure level.

If an image sensor moves during the capture of an image, or if a part of a scene being captured in the image moves during the capture of the image, there may be a resulting difference between content captured at pixel locations associated with the first exposure level and pixel locations associated with the second exposure level. For example, where the exposure level is determined by an exposure time, the scene may change between the end of the second time period and the end of the first period.

The input image data may represent, for example, at least one characteristic of the light captured by an image sensor. The input image data may be representative of an intensity of the light captured by each sensor pixel, the intensity of light may be proportional to the number of photons captured by that sensor pixel. The intensity may represent a luminance of captured light, which is for example a measure of intensity of light per unit area rather than an absolute intensity. In other examples, the input image data may be representative of a brightness of captured light, which may be considered to correspond to a perception of a luminance, which may or may not be proportional to the luminance. The input image data may be representative of any photometric quantity or characteristic that may be used to represent the visual appearance of the image represented by the data. The input image data may be in any suitable format, for example raw image format.

In some examples, each pixel location of the image is associated with a color channel. For example, an image sensor used to capture the image may comprise a color filter array that includes a pattern of color filter elements. Color filter elements correspond to respective sensor pixels of an array of sensor pixels of the image sensor. The color filter array pattern may be considered to form a mosaic or a repeating pattern. An element in the color filter array may allow light of a particular color to pass through to the corresponding sensor pixel. A color may refer to any range of wavelengths of light, for example, a clear, transparent, or white color filter element which passes substantially all the received light through may still may be considered a color filter element. In other examples, colors may have narrower wavelength ranges and may include, for example, green, blue, and red. In this way, the color filter array may allow different sensor pixels of an array of sensor pixels to receive different colors of incident light. Thereby, pixel locations of the image may each be associated with a single color. The pixel locations of the image may be arranged in a color filter pattern. Many photosensors are not sensitive to the wavelength of incoming light and therefore would be unable to provide color information from the detected light without a filter array. By separating incoming light into different wavelengths, corresponding to different colors, using a color filter array, the intensity of the light in these different wavelength ranges can be ascertained. An example of a color filter pattern may include a Bayer filter pattern, such that the pixels in the image may be arranged in a Bayer color filter pattern.

As discussed above, if a part of a scene captured by an image, or an image sensor used to capture the image, moves during an exposure, the image captured by a first set of pixel locations associated with a first exposure level may differ to the image captured by a second set of pixel locations associated with a second, different, exposure level. When generating an HDR image, input image data representing the first and second set of pixel locations may be combined to generate an image having a higher dynamic range than that which may be achievable by an image sensor configured to capture images using only a single exposure level. However, if the image captured by the first set of pixel locations differs to an image captured by the second set of pixel locations, attempting to combine data representing the two sets of pixel locations may result in blurring and/or a loss of detail. In the example method of FIG. 1, the method comprises determining regions of the image comprising differences between images captured by the first and second sets of pixel locations and generating improved image data accordingly. The method achieves this by generating first interpolated image data, corresponding to the first exposure level, to be compared with the second input image data to determine whether the scene or image sensor moved during the exposure and/or whether image data representing the first and second set of pixel locations can be combined. In some examples, the method also comprises generating second interpolated image, to be compared to the first input image. At block 120 the method comprises generating first interpolated image data associated with the first exposure level, the first interpolated image data comprising pixel intensity values for pixel locations in the second set. At block 130 the method comprises applying a noise model to generate motion detection data based on differences between the second input image data and the first interpolated image data. For example, the method may comprise aligning the first interpolated image data with the second input image data using an exposure ratio defining a ratio between the first exposure level and the second exposure level, determining at least one differences between pixel intensity values of the aligned first interpolated image data with respective pixel intensity values of the second input image data, and modifying the at least one difference according to the noise model.

Images captured using image sensors often comprise image noise. Image noise may be a random variation of brightness or color at pixels in an image. Image noise may be dependent on electronic noise and may be produced by the image sensor and/or circuitry involved in transferring image data from the image sensor. Different types of image noise may include gaussian noise which may be dependent on the level of illumination and the temperature of an image sensor, and the electronic circuits connected to the image sensor. The actual noise level in an image may also be affected by the amplification of the image data at a sensor pixel. Other types of image noise include salt-and-pepper noise, shot noise, quantization noise, anisotropic noise, and periodic noise. Image noise may also be affected by the exposure time and size of an image sensor. Any differences between the first interpolated image data and second input image data resulting from noise are accounted for at block 130.

Following this process, the method comprises, at block 140, generating improved image data by combining data from the received first and second input image data in dependence on the motion detection data. For example, in regions of an image in which there is motion, first input image data representing the first set of pixel locations may not be combined with second input image data representing the second set of pixel locations as the scene captured by these two sets of pixel locations may differ over that region. However, in regions without detected motion, image data representing both sets of pixel locations may be combined resulting in a higher dynamic range. Blocks 120 to 140 of the method of FIG. 1 will be described in further detail later with reference to other Figures.

In some examples, the method may comprise generating second interpolated image data associated with the second exposure level, the second interpolated image data may comprise a pixel intensity value for pixel locations in the second set. In such examples, applying a noise model to generate motion detection data may be based on differences between the second input image data and the first interpolated image data and differences between the first input image data and the second interpolated image data.

Figure 2:
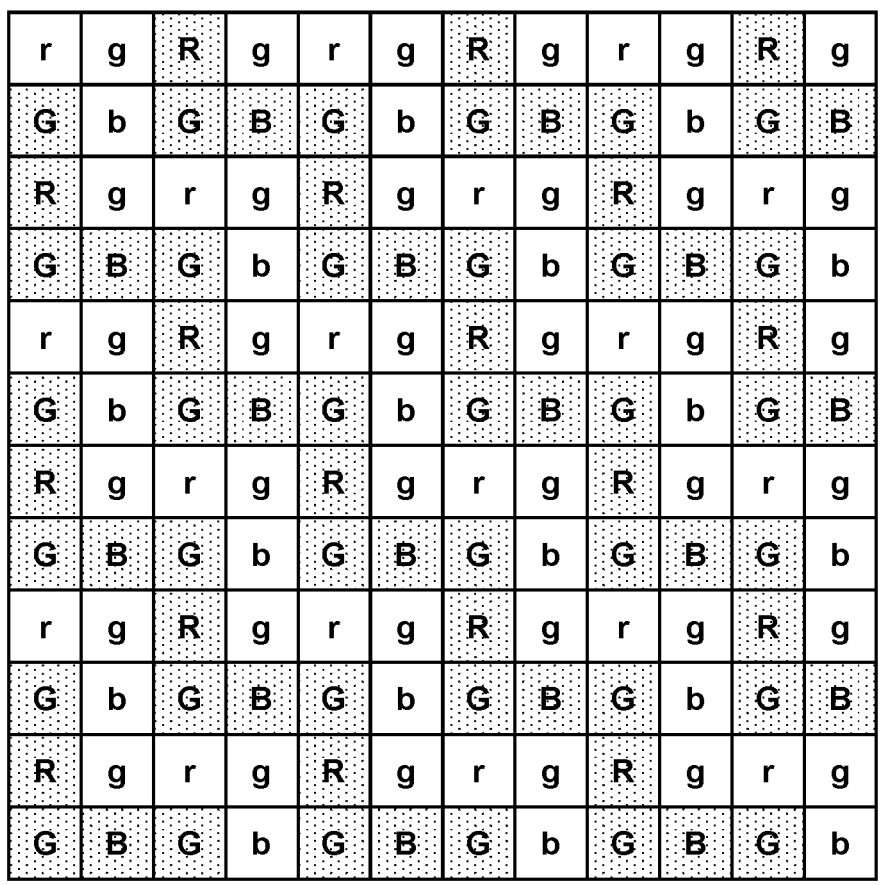
FIG. 2 is a schematic diagram of at least a portion of an image comprising a first set of pixel locations and a second set of pixel locations according to an example.

FIG. 2 shows schematically an example arrangement of the first set of pixel locations and the second set of pixel locations of an at least a portion of an image 200. In the example of FIG. 2, pixel locations belonging to the first set of pixel locations are represented by white blocks and pixel locations belonging to the second set of pixel locations are represented by blocks filled with a dot pattern. In the example of FIG. 2 the first and second set of pixel locations are arranged in an alternating zigzag pattern, for example, wherein diagonal zigzag rows of pixel locations belonging to the first set of pixel locations are separated by diagonal zigzag rows of pixel locations belonging to the second set of pixel locations. Each pixel location in the example of FIG. 2 is labelled with a letter associated with a color channel, wherein the letter "r" represents the red color channel, the letter "g" represents the green color channel, and the letter "b" represents the blue color channel. Letters in the blocks representing pixel locations of the first set of pixel locations are written in uppercase letters and letters in the blocks representing pixel locations belonging to the second set of pixel locations are written in lowercase letters. The arrangement of the color channels in FIG. 2 follows a Bayer color filter pattern. It is acknowledged that the pixel arrangement in FIG. 2 is a non-limiting example. Other arrangements of the pixel locations may also be possible. For example, the first and second set of pixel locations may be arranged in a checkerboard pattern, as alternating rows, as alternating columns, as alternating pairs of rows, as alternating pairs of columns, and any other suitable arrangement of the first and second set of pixel locations. Other color filter array patterns may be used, and in some examples the choice of color filter array pattern may be dependent on the arrangement of the first and second set of pixel locations.

Features of FIG. 1 will now be explained in more detail.

Generating First Interpolated Image Data

As discussed above, in regions of an image in which a part of a scene captured by the image changes between exposure of the first set of pixel locations and exposure of the second set of pixel locations, the image data representing the first and second set of pixel locations may not be combined as the two sets of pixel locations may have effectively captured different images and so to combine them may result in a loss of detail in an output image and/or artefacts for example, multiple instances of the same object, split objects, or double edges. To detect whether the scene has moved between the exposure of the first set of pixel locations and the exposure of the second set of pixel locations, pixel intensity values may be compared. However, looking at FIG. 2 it is clear that pixel locations of the first set of pixel locations and pixel locations of the second set of pixel locations do not overlap spatially. Therefore, at pixel locations of the second set of pixel locations, pixel intensity values associated with the first exposure level are generated. In an example, first interpolated image data at a pixel location is generated based at least on first input image data representing neighboring pixel locations. In some examples, first input image data may be smoothed. For example, smoothed data at a pixel location may be generated based at least on first input image data representing neighboring pixel locations and first input image data representing the pixel location being smoothed.

In an example where the first and second set of pixels are arranged as in FIG. 2 smoothing first input image data at a green pixel location may comprise applying a kernel $K'_G$ where:

$$K'_G = \begin{pmatrix} 1 & 0 & 1 & 0 & 1 \\ 0 & 0 & 0 & 0 & 0 \\ 1 & 0 & 1 & 0 & 1 \\ 0 & 0 & 0 & 0 & 0 \\ 1 & 0 & 1 & 0 & 1 \end{pmatrix} \Big/ 9$$

Generating first interpolated image data may at a green pixel location belonging to the second set of pixel locations may comprise applying a kernel $K_G$ where:

$$K_G = \begin{pmatrix} 1 & 0 & 1 \\ 0 & 0 & 0 \\ 1 & 0 & 1 \end{pmatrix} \Big/ 4$$

Due to the Bayer filter pattern, and the resulting difference in the arrangement of green pixels to the arrangement of blue and red pixels, used in the example of FIG. 2 the kernels applied to green pixel locations may not be applied to red and blue pixels. Smoothing first input image data a red or a blue pixel location may be comprise applying the following kernel $K'_{RB}$:

$$K'_{RB} = \begin{pmatrix} 1 & 0 & 0 & 0 & 1 \\ 0 & 0 & 0 & 0 & 0 \\ 0 & 0 & 1 & 0 & 0 \\ 0 & 0 & 0 & 0 & 0 \\ 1 & 0 & 0 & 0 & 1 \end{pmatrix} \Big/ 5$$

Generating first interpolated image data at red or blue pixel locations belonging to the second set of pixel locations may comprise applying a kernel $K_{RB}$ where:

$$K_{RB} = \begin{pmatrix} 0 & 0 & 1 & 0 & 0 \\ 0 & 0 & 0 & 0 & 0 \\ 1 & 0 & 0 & 0 & 1 \\ 0 & 0 & 0 & 0 & 0 \\ 0 & 0 & 1 & 0 & 0 \end{pmatrix} \Big/ 4$$

The kernels given above are non-limiting examples and are dependent on the pixel location arrangement of FIG. 2. In examples having different arrangements of the first and second set of pixel locations and different color filter array patterns, different kernels may be used. In some examples, data representing more neighboring pixel locations may be considered when generating smoothed and/or interpolated data. In other examples, data representing fewer neighboring pixel locations may be considered when generating smoothed and/or interpolated data. In some examples the number of neighboring pixel locations which are considered when generating smoothed and/or interpolated data may be dependent on pixel density of the received image data. For example, if there is a higher pixel density then more neighboring pixel locations may be used to smooth and/or interpolate the data.

The data resulting from the application of the kernels $K_G$ and $K_{RB}$ at appropriate pixel locations to generate first interpolated image data (i.e. $K_G$ at green pixel locations belonging to the second set of pixel locations and $K_{RB}$ at red and blue pixel locations belonging to the second set of pixel locations) and the application of kernels $K'_G$ and $K'_{RB}$ to smooth first input image data (i.e. $K'_G$ at green pixel locations belonging to the first set of pixel locations and $K'_{RB}$ at red and blue pixel locations belonging to the first set of pixel locations), may be expressed as a plane $I_{S1}^1$ which may be called the first isotropic interpolation.

The kernels described above may also be applied to second input image data in order to smooth the second input image data and to generate second interpolated image data. For example, the kernels $K_G$ and $K_{RB}$ may be applied at pixel locations belonging to the first set to generate second interpolated image data and the kernels $K'_G$ and $K'_{RB}$ may be applied at pixel locations belonging to the second set to smooth the second input image data. The data resulting from applying the above kernels to generate second image data and to smooth second input image data may be expressed as a plane $I_{S1}^2$ which may be called the second isotropic interpolation. In some examples, applying a noise model to generate motion detection data based on differences between the second input image data and the first interpolated image data may comprise smoothing the second input for the second set of pixel locations; and applying the noise model to generate motion detection data base on differences between the smoothed second input image data and the first interpolated image data.

Determining at Least One Difference in Pixel Intensity

As discussed above, generating motion detection data based on differences between the second input image data and the first interpolated image data may comprising aligning the image data according to an exposure ratio, determining a difference between pixel intensity values of the aligned first interpolated image data with respective pixel intensity values of the second input image data. In some examples, the second input image data may be smoothed second input image data. The first interpolated image data may comprise, for pixel locations in the second set, a pixel intensity value associated with the first exposure level and the second input image data may comprise, for pixel locations in the second set of pixel locations a pixel intensity value associated with the second exposure level. By determining at least one difference between pixel intensity values for pixel locations represented by the first interpolated image data and respective pixel intensity values represented by the second input image data, it may be possible to determine regions of the image for which the scene captured by the image is different for the first set of pixel locations and the second set of pixel locations, for example due to the movement of a part of the scene or movement of an image sensor used to capture the scene.

In some examples, determining the at least one difference may comprise aligning the first interpolated image data and the second input image data using an exposure ratio defining a ratio between the first exposure level and the second exposure level. Aligning the first interpolated image data and the second input image data may compensate for any differences in pixel intensity which are due to differences in the exposure between the first and second exposure levels. Aligning the first interpolated image data and the second input image data may comprise suitably operating on pixel intensity values with the exposure ratio. For example, aligning may comprise dividing pixel intensity values in the first image data by the exposure ratio.

In some examples, the second interpolated image data and first input image data may also be compared in the same way as above. The results from the determination of differences between the first interpolated image data and the second input image data may be compared with the determination of differences between the second interpolated image data and the first input image data to determine whether motion has been detected in the scene captured by the image.

In one example determining at least one difference may comprise calculating a difference of mean from the planes $I_{S1}^1$ and $I_{S1}^2$. A 3×3 box filter may be used to smooth the long and short isotropic interpolations, $I_{S1}^1$ and $I_{S1}^2$, the difference of mean may then be calculated based on an absolute difference of the smoothed result. This may be expressed as:

$$DoM_{i,j} = \frac{1}{8}\left|\sum_{k=-1}^{1}\sum_{l=-1}^{1}I_{S1}^1(i+k, j+l) - \sum_{k=-1}^{1}\sum_{l=-1}^{1}I_{S2}^2(i+k, j+l)\right|$$

where $DoM_{i,j}$ is the difference of mean between the pixel intensity value of the first isotropic interpolation and the second isotropic interpolation at each pixel location (i,j). Pixel locations having a non-zero value of DoM may indicate pixel locations for which the image captured by the first set of pixel locations differs to the image captured by the second set of pixel locations. However, other factors may contribute to differences between the first isotropic interpolation and the second isotropic interpolation, for example noise, and it may be desirable to distinguish between differences arising due to these other factors and differences due to movement in a scene captured in at least a portion of an image.

Generating Motion Detection Data

As discussed above, there may be an expected degree of noise in an image captured using an image sensor. The noise may be dependent on a number of variables including the exposure level and the image sensor used to generate image data. In order to ensure that any differences between either the first interpolated image data and the second input image data or between the first isotropic interpolation and the second isotropic interpolation, determined in the previous process, are due to a change in the scene captured by the image and not due to noise, the method may comprise modifying the at least one difference according to a noise model, to generate motion detection data.

In an example, a noise value may be subtracted from the at least one difference at the pixel locations. For example, the noise level maybe subtracted from the DoM at each pixel location calculated previously. The noise value may be different at each pixel location. The noise value may be calculated by scaling an expected noise level at the local pixel intensity, according to a noise model, with a parameter. By subtracting a noise value from the difference calculated at pixel locations, differences between the first interpolated image data and second input image data which are below a noise level, may be disregarded. The result of this process for at least one pixel may be output as motion detection data.

The parameter used to scale the expected noise value may be a constant or may vary for different regions of the image. The multiple may be a linear or a non-linear quantity. In some examples, the multiple comprises a scaling factor which may depend on sensor gain. In some examples, the multiple may be determined during a calibration process, which may also be considered a tuning process. The calibration process may comprise performing the method on sample image data and modifying the multiple to optimize the result of the method. In some examples the noise model is a configured to reduce temporal noise. Data representing the noise model may be stored as a look up table.

In some examples, generating motion detection data comprises generating a motion detection mask indicating at least one region of the image in which the image differs between first input image data and the second input image data. In some examples, the motion detection mask may be generated by taking the result of the $DoM_{i,j}$ calculation, subtracting a noise level from the $DoM_{i,j}$ value at each pixel location and dilating the resulting data within a 2×2 window. In some examples generating the motion detection mask comprises dilating the result of modifying the at least one difference according to the noise model and multiplying the result by a motion response parameter. The motion response parameter may be used to control the strength of the motion detection, for example the motion response parameter may be used to increase or decrease the sensitivity of the motion detection mask. The resulting motion detection mask may be used when generating improved image data which will be discussed further below.

Generating Improved Image Data

In an example, generating improved image data from the received input image data is dependent on the motion detection data, for example the motion detection mask. The motion detection mask may indicate regions of the image for which motion has been detected. In these regions, the output image data may not be generated by combining data representing the first set of pixel locations and data representing the second set of pixel locations due to the differences in content captured between the two sets of pixel locations. In regions where the motion detection mask indicates that there is not motion between the first and second exposures, improved image data may be generated as a combination of the first input image data and the second input image data.

i. Combined Exposure

In an example, generating improved image data comprises determining that the motion detection data is not indicative of motion being detected for a given pixel location and in response to said determining, combining the received first and second input image data. Determining whether motion has been detected at the pixel location based on the motion detection data may comprise using the motion detection mask, generated as above, to determine whether the pixel location is positioned in a region of the image comprising motion. The number of neighboring pixel locations which are considered when generating improved image data may be dependent on the pixel density of the received input image data and the color filter array pattern which is applied to the pixel locations in the image data.

In an example combining the received first and second input image data to generate improved image data for the given pixel location may comprise at least: generating aligned image data by aligning the first input image data with the second input image data based on the exposure ratio. As discussed above the intensity value for the first and second set of pixel locations will initially be offset from one another due to the differences in the exposure levels. Therefore, generating aligned image data may allow image data representing the first and second set of pixel locations to be combined without introducing systematic errors. In an example, generating aligned image data may comprise subtracting the black level, shifting up the input data to most significant bit (MSB) align it with output data and then dividing the first input image data by the exposure ratio.

Combining the received first and second input image data may also comprise determining whether the given pixel location is in a region representing a corner in the image; and performing a predetermined action in response to the determination whether the given pixel location is in a region representing a corner in the image. Any suitable method of corner detection or detection of change in local gradient may be used to determine whether the pixel location is in a region representing a corner in the image.

Areas in an image which are highly anisotropic in more than one direction may represent corners in the image. For example, in an image representing a building with a contrasting background such as the sky, the areas of the image representing the corners of the building, corners of windows/doors etc. may be highly anisotropic. In general, it is desirable in image processing to interpolate along lines and/or edges in images as this may help sharpen the boundaries between different objects in an image, thereby increasing detail. However, interpolating across corners can produce undesirable effects. For example, interpolating across a corner may cut-off the tip of the corner in the output image and thereby a loss of detail and/or accuracy in the image may result. By detecting corners in an image, generating output by interpolating across these corners may be avoided. An example method of detecting corners will be described below with reference to FIGS. 3a and 3b.

Figure 3A:
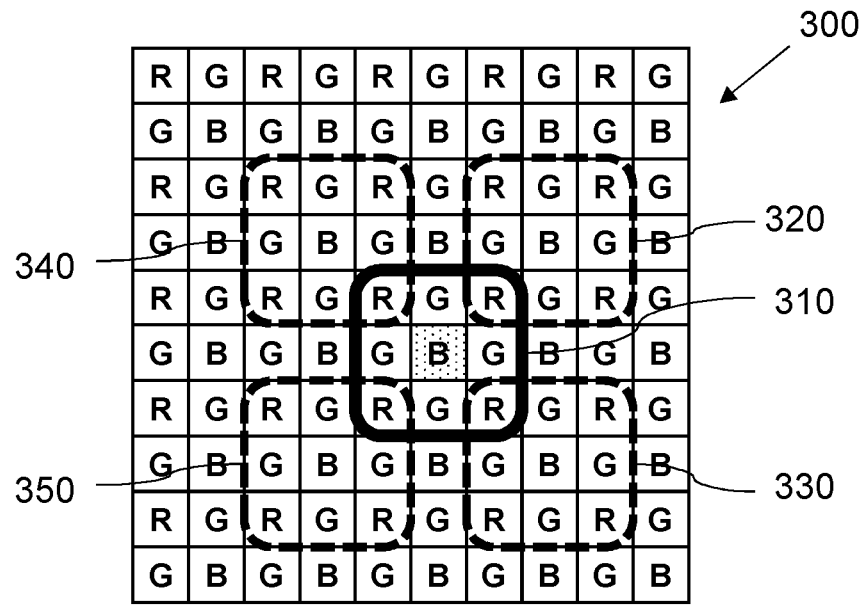
FIG. 3a is a schematic diagram of part of a corner detection process according to an example.
Figure 3B:
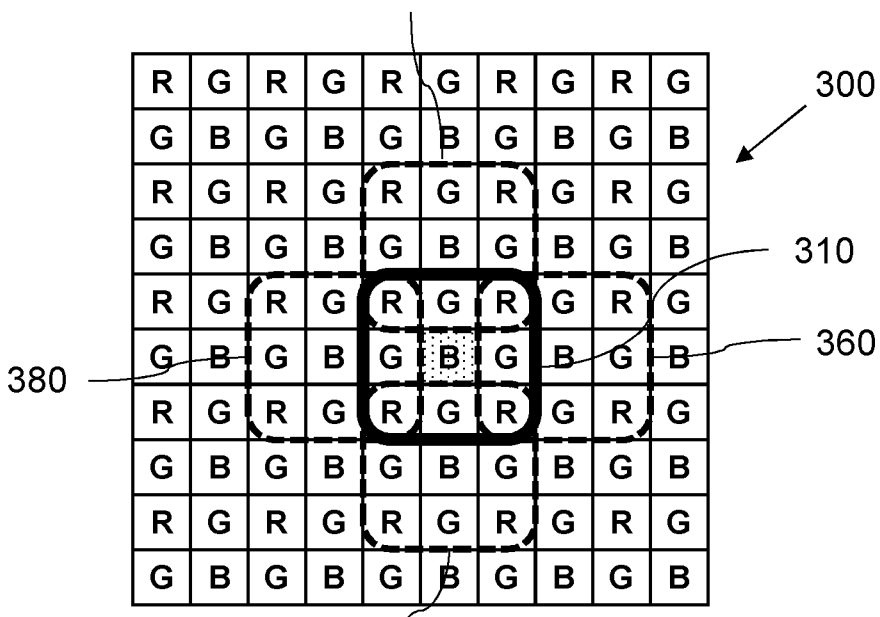
FIG. 3b is a schematic diagram of a different part of the corner detection process according to an example.

The example method of detecting whether a given pixel location is in a region representing a corner comprises comparing pixel intensity values of pixel locations in a region centered on the given pixel location to pixel intensity values of respective pixel locations in surrounding regions. For each of a plurality of pixel regions comprising a plurality of pixel locations, the pixel regions surrounding and partially overlapping a central pixel region centered on the given pixel location, the method may comprise determining from the aligned image data a sum of absolute differences between pixel intensity values of pixel locations in each of the plurality of pixel regions and the respective pixel locations in the central pixel region. In the example of FIGS. 3a and 3b the pixel locations representing the at least a portion of the image 300 are shown. As we are considering aligned data all the pixel locations representing the portion of the image are shown as having the same exposure level. As an example, in FIGS. 3a and 3b the pixel location which we are considering is a blue pixel and the central pixel region 310 is a 3×3 pixel region centered on the blue pixel location.

The plurality of pixel regions surrounding and overlapping the central pixel region are 3×3 pixel regions offset by two pixels from the central pixel region such that each pixel location in the plurality of pixel regions have the same color as the respective pixel location in the central pixel region. Pixel intensity values are compared only between pixel locations belonging to the same color channel. In an example, eight pixel regions surrounding the central pixel region are considered, FIG. 3a shows diagonally offset surrounding regions 320, 330, 340, and 350, and FIG. 3b shows vertically and horizontally offset surrounding regions 360, 370, 380, and 390. The plurality of pixel regions 320-390 are shown on separate Figures so as not to obfuscate either Figure. The number of pixel locations in the central pixel region is equal to the number of pixel locations in each of the plurality of pixel regions.

For each pixel region, a sum of absolute differences between pixel intensity values in that region and the central pixel region is calculated according to the following:

$$SAD_k = \sum_{i=1}^{3} \sum_{j=1}^{3} |W_k(i, j) - W_c(i, j)|$$

where $SAD_k$ represents the Sum of Absolute Differences for a pixel region k, $W_k(i, j)$ represents pixel intensity values in the pixel region k and coordinate positions (i, j) within said pixel region, and $W_c(i, j)$ represents pixel intensity values in the central pixel region at coordinate position (i, j) within the central pixel region. In the example of FIGS. 3a and 3b there are eight pixel regions and so $k \in \{1, 2, 3, 4, 5, 6, 7, 8\}$.

To determine whether the differences in surrounding pixel regions may be accounted for due to noise at least one sum of absolute differences may be compared to a noise level. For example, the method may comprise comparing the sum of absolute differences from a pixel region having the lowest sum of absolute differences with an expected noise level at the given pixel location based on the noise model. In some examples, the process may be repeated to generate a corner detection mask identifying at least one region of the image representing a corner in a scene captured by the image.

As discussed above if a region does not comprise a corner it may be desirable to interpolate pixel intensity values across this region, whereas if the region does comprise a corner it may not be desirable to interpolate pixel intensity values across this region.

In an example, dependent on a determination that the given pixel location is in a region representing a corner in the image, the predetermined action may comprise using a portion of the aligned image data representing the given pixel location as the improved image data. By using the aligned image data as the improved image data in a region representing a corner, the detail showing the corner in the output image may be maintained.

In an example, dependent on a determination that the given pixel location is not in a region representing a corner in the image, the predetermined action may comprise generating improved image data representative of the given pixel location by interpolating using the aligned image data. Aligning the image data as discussed previously may result in the pixel locations of the second set of pixels having a higher relative level of noise compared to pixel locations of the first set of pixels. The purpose of interpolating here is to directionally smooth the pixel intensity values, weighting pixel intensity values according to their noise level. This may balance a trade-off between detail and noise in the output image.

Interpolating using the aligned image data may comprise generating a first plurality of gradients, generating a first plurality of interpolated values, and combining the first plurality of interpolated values according to the gradients to generate improved image data. Any suitable method of combining the interpolated values according to the gradients may be used such that the direction of interpolation is the direction of least gradient or an isotropic interpolation is used where there is insufficient gradient in any direction. The calculations involved when interpolating using the aligned image data (i.e. using image data representative of both the first and second sets of pixels) are different to the calculations used when interpolating using image data representative of the first or second sets of pixel locations as will be discussed below, accordingly in this discussing the gradients and interpolated values belong to a first plurality of gradients and a first plurality of interpolated values respectively.

Each of the gradients of the first plurality of gradients may be associated with a direction from a plurality of directions. For example, the first plurality of gradients may comprise a gradient value for each of the directions: horizontal ($G_H$), vertical ($G_V$), first diagonal ($G_{D45}$), and second diagonal ($G_{D135}$). The gradient values are obtained by calculating absolute differences of data representing appropriately offset pairs of pixel locations belonging to the same color channel as each other and calculating a weighed sum of these differences. In some examples, the gradients of the first plurality of gradients may be dependent on a noise model, for example, from the weighted sum of differences calculated above, a multiple of an expected noise level at the local pixel intensity according to some noise model may be subtracted. Thereby, gradients which are lower than an expected noise level may be disregarded.

At least some of the interpolated values of the first plurality of interpolated values may be associated with directions from the plurality of directions. For example, the first plurality of interpolated values may comprise an interpolated value for each of the directions: vertical ($I_V$), horizontal ($I_H$), first diagonal ($I_{D45}$), and second diagonal ($I_{D135}$). The first plurality of interpolated values may also comprise an interpolated value associated with an isotropic interpolation ($I_{ISO}$). In some examples, the interpolated values of the first plurality of interpolated values are dependent on the exposure ratio. As the first plurality of interpolated values are calculated from both the first input image data and second input image data the exposure ratio may be considered when calculating the interpolated values. For example, coefficients used to weight the contribution from data representing neighboring pixel locations may be determined based on the exposure ratio. In an example, the interpolated values of the first plurality of interpolated values are generated by interpolating from aligned image data representing neighboring pixel locations, the image data representing each neighboring pixel location may be weighted according to a respective variance of said neighboring pixel location.

Figure 4:
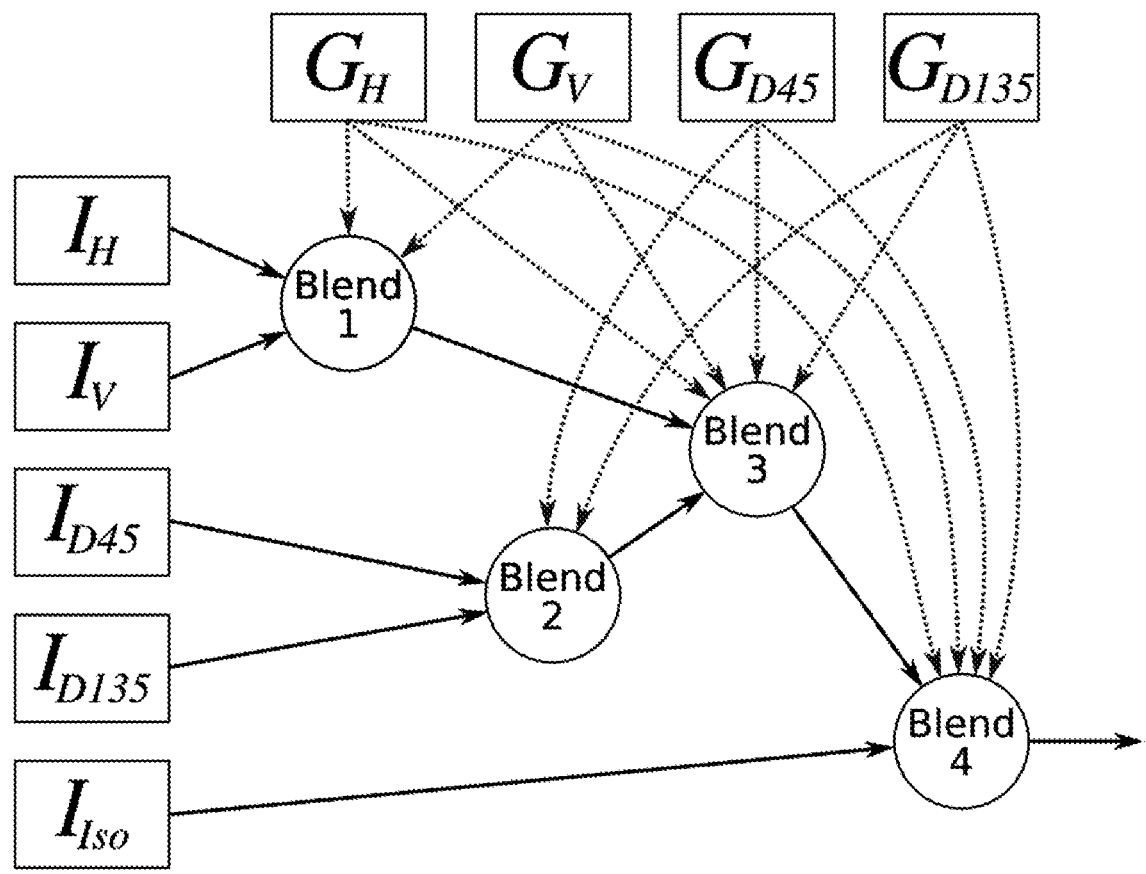
FIG. 4 is a schematic diagram of a combination process according to an example.

FIG. 4 shows a diagram of a method of combining the first plurality of interpolated values according to the first plurality of gradients to generate improved image data. At "Blend 1" the horizontal and vertical interpolated values ($I_H$ and $I_V$) are blended according to the horizontal and vertical gradients ($G_H$ and $G_V$), at "Blend 2" the two diagonal interpolated values ($I_{D45}$ and $I_{D135}$) are blended according to the diagonal gradients ($G_{45}$ and $G_{135}$), at "Blend 3" the results from "Blend 1" and "Blend 2" are blended according to the first plurality of gradients ($G_H$, $G_V$, $G_{45}$, and $G_{135}$). A final blend, "Blend 4" then combines the results of "Blend 3" with the isotropic interpolated value $I_{ISO}$ according to the first plurality of gradients ($G_H$, $G_V$, $G_{45}$, and $G_{135}$). The result of this final blend, "Blend 4" is used as the improved image data at the pixel location.

ii. Independent Exposure

In an example, generating improved image data comprises determining that the motion detection data is indicative of motion being detected for a given pixel location and in response to said determining, selecting one of the received first input image data and the second input image data as a primary source of improved image data for the given pixel location. The choice of using either the first or the second input image data may be dependent on a detection of a clipped region or a threshold exposure as will be discussed below. In regions of the image where a motion detection mask indicates that there is movement in a scene captured by the image, the image captured by data representing the first set of pixel locations may differ to the image captured by data representing the second set of pixel locations. Accordingly, the improved image data may be generated from image data representing only one of the first or the second set of pixel locations. In an example where it is determined that the improved image data is to be generated from first input image data, at the first set of pixel locations, the improved image data may comprise first input image data and at the second set of pixel locations, the improved image data may comprise image data generated by interpolating from first input image data representing neighboring pixel locations. In an example where it is determined that the improved image data is to be generated from second input image data, at pixels locations represented by the second set of pixel locations, the improved image data may comprise second input image data and at the first set of pixel locations, the improved image data may comprise image data generated by interpolating from second input image data representing neighboring pixel locations. In an example, dependent on the pixel location belonging to the set of pixels represented by the one of either the first input image data or the second input image data from which output data is generated, generating output data from the one of either the first input image data or the second input image data may comprise selecting a portion of the one of either the first input image data or the second input image data representing the pixel location.

In an example, when the given pixel location is not represented by the first or second input image data selected as the primary source, generating the improved image data for the given pixel location based upon the selected first or second input image data may comprise generating a second plurality of gradients, generating a second plurality of interpolated values, and combining the second plurality of interpolated values according to the second plurality of gradients. Each of the second plurality of gradients may be generated using the selected first or second input image data and each gradient may be associated with a direction from the plurality of directions. For example, the second plurality of gradients may comprise a gradient value for each of the directions: vertical ($G_V^-$), horizontal ($G_H^-$), first diagonal ($G_{D45}^-$), and second diagonal ($G_{D135}^-$) wherein the superscript "–" indicates that the gradient is calculated from data representing neighboring pixel locations belonging to a different set of pixel locations than the given pixel location at which improved image data is being generated. In some examples, the second plurality of gradients may be dependent on the noise model. For example, a multiple of the expected noise level at the local pixel intensity may be subtracted from the calculated gradient values such that gradients which are smaller than an expected noise are disregarded.

The interpolated values of the second plurality of interpolated values may be generated using the selected first or second input image data, at least some of the interpolated values of the second plurality of interpolated values may be associated with a direction from the plurality of direction. For example, the second plurality of interpolated values may comprise an interpolated value for each of the directions: vertical ($I_V^-$), horizontal ($I_H^-$), first diagonal ($I_{D45}^-$), and second diagonal ($I_{D135}^-$). The second plurality of interpolated values may also comprise an interpolated value associated with an isotropic interpolation ($I_{ISO}^-$), wherein, as before, the superscript "−" indicates that the interpolated value is calculated from data representing neighboring pixel locations belonging to a different set of pixel locations than the given pixel location at which improved image data is being generated. In this example, as the interpolated values are calculated from data representing pixel locations having the same exposure level as each other, the weightings used to interpolate may not be dependent on the exposure level but may instead be constant. In some examples, the second plurality of interpolated values may be combined to generate improved image data according the second plurality of gradients, for example, as described previously with reference to FIG. 4.

When capturing images, pixel locations associated with a higher exposure level may be more likely to be saturated in comparison with pixel locations associated with a lower exposure level. A saturated pixel may also be referred to as a clipped pixel. Saturation may occur when a pixel intensity value at a pixel location reaches an upper limit during an exposure. Light falling on an already saturated pixel location during an exposure may not be recorded. Therefore, as pixel locations become saturated there may be a loss of information recorded in the image. It may be desirable when processing image data to avoid the use of image data representing saturated pixel locations. In an example, dependent on a determination that the given pixel location is positioned in a clipped region comprising at least one saturated pixel location, the saturated pixel location being associated with a higher exposure level of the first and the second exposure levels, generating improved image data for the given pixel location may comprise selecting the received first or second input image data associated with a lower exposure level of the first and second exposure levels. For example, where the second set of pixel locations are associated with a lower exposure level, at the second set of pixel locations second input image data may be selected, and at the first set of pixel locations image data representing neighboring pixel locations belonging to the second set of pixels, for examples second input image data, may be processed as described above.

In this manner following a determination that the image data representing the first set of pixel locations comprises a clipped region, for said clipped region improved image data may be generated from data representing the second set of pixel locations, wherein the second set of pixel locations are associated with a lower exposure level and therefore are less likely to have clipped pixel locations and/or may have a reduced number of clipped pixel locations in comparison to the first set of pixel locations. In an example where the first set of pixel locations is associated with a higher exposure level than the second set of pixel locations, dependent on a determination that a local intensity of the first set of pixel locations neighboring a given pixel location is below a predetermined threshold, the method may comprise, for the given pixel location, generating improved image data using smoothed second input image data if the given pixel location belongs to the second set of pixel locations and second interpolated image data if the given pixel location belongs to the first set of pixel locations. The local pixel intensity may be determined by, for example, applying a 3×5 box filter.

Image Processing System

Figure 5:
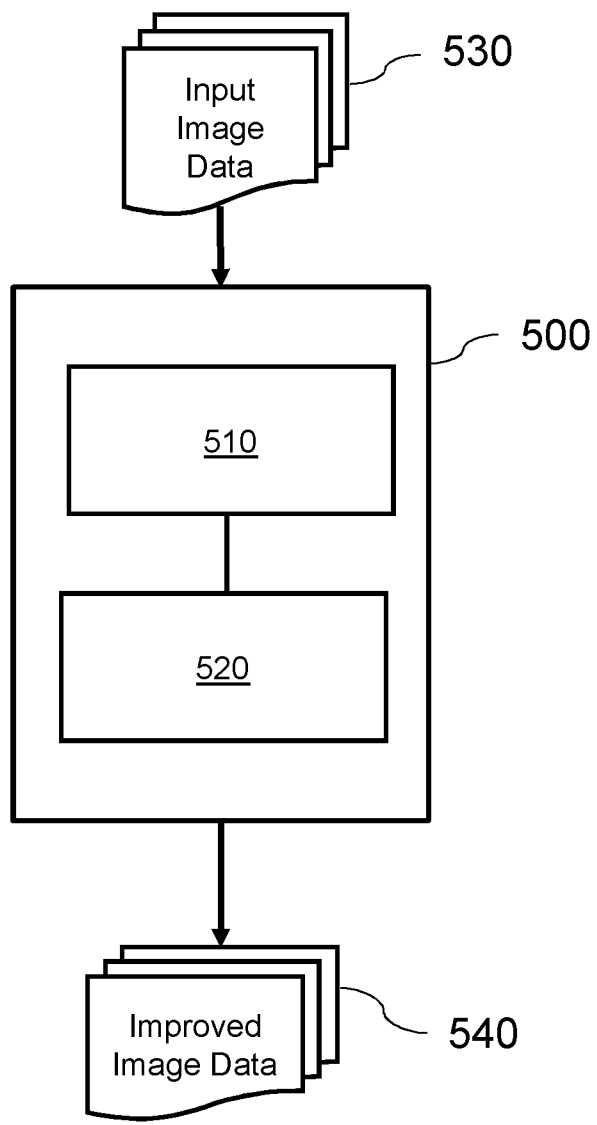
FIG. 5 is a schematic diagram of an apparatus according to an example.

The examples described herein may be implemented using any suitable apparatus, for example, an image processing system. An image processing system may comprise any combination of hardware and program code suitable for performing the method described herein. FIG. 5 shows an example of an image processing system 500, the image processing system 500 comprising at least one processor 510 and at least one storage medium 520. The at least one storage medium 520 may comprise any number of volatile or non-volatile memories. For example, the at least one storage medium 520 may comprise, a hard drive, a CD-ROM disc, a USB-drive, a solid-state drive, RAM, or any other form of magnetic storage device, optical storage device, or flash memory device, maintained locally or accessed remotely, capable of having stored thereon computer readable code suitable for the function described herein. The at least one processor 510 may be a standard central or graphical processing unit (CPU or GPU), or a custom processing unit designed for the purposes described herein. The at least one processor 510 may comprise any number of processing cores. In some examples, the image processing system 500 may be a computing device, in other examples the image processing system 500 may comprise a plurality of computing devices communicatively coupled over a network, for example, a wide-area network such as the internet, a wireless or hardwired local area network or any other type of network. The image processing system 500 may comprise any number of interfaces including input and/or output devices for sending and/or receiving data.

In an example, the at least one storage medium 520 may store instructions that when executed by the at least one processor 510 cause the at least one processor 510 to receive input image data 530 representative of at least a portion of an image, the input image data comprising first input image data representing a first set of pixel locations associated with a first exposure level and second input image data representing a second set of pixel locations associated with a second, different, exposure level. In some examples input image data 530 is received from an image sensor. The image sensor may be located locally to the image processing system 500, for example the image processing system 500 may be located with an image sensor in an image capture device such as a smartphone or a camera. In other examples the image processing system 500 may comprise a network interface for receiving input image data 530 over a network. Input image data 530 may be received from one or multiple sources.

The at least one storage medium 520 may store instructions that when executed by the at least one processor 510 cause the at least one processor 510 to: generate first interpolated image data associated with the first exposure level, the first interpolated image data comprising pixel intensity values for pixel locations in the second set. In some examples, the image processing may store at least a portion of the first interpolated image data in the at least one storage medium 520. The at least one storage medium 520 may store instructions that when executed by the at least one processor 510 cause the at least one processor 510 to: apply a noise model to generate motion detection data based on differences between the second input image data and the first interpolated image data, and to generate improved image data 540 by combining data from the received first and second input image data 540 in dependence on the motion detection data. In some examples data representing the noise model may be stored in memory at the image processing system and accessed during any processes described herein involving the noise model, for example in the form of a look-up table.

The image processing system 500 may output the improved image data 540 in any suitable data format. In some examples the output improved image data is in raw image format and may be further processed using any other methods. In other examples, the improved image data 580 may be further processed by the image processing system 500 to generate an output image in digital format, for example, JPEG, PNG, or any other suitable digital image format.

Figure 6:
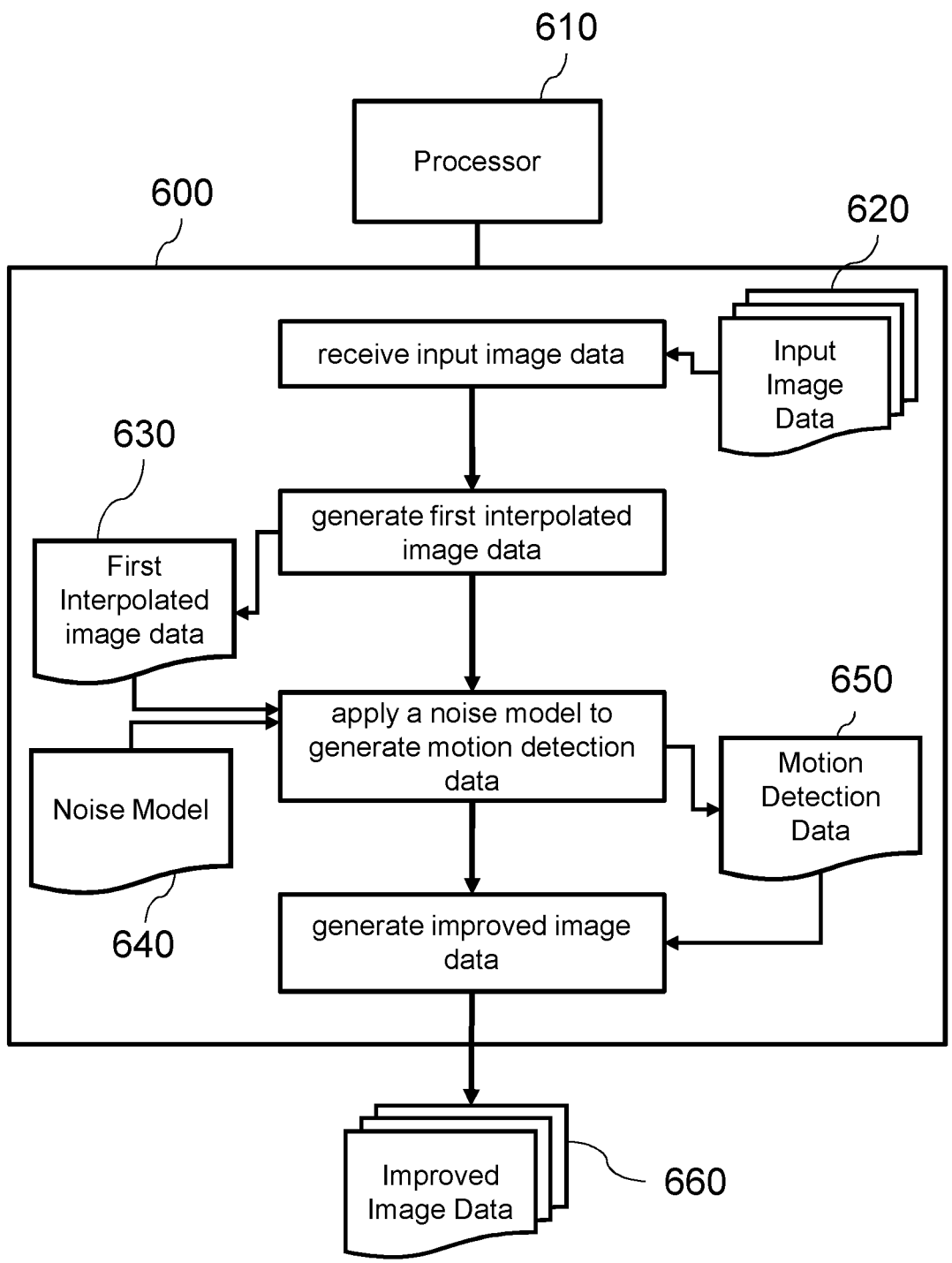
FIG. 6 is a schematic diagram of a computer readable storage medium according to an example.

FIG. 6 shows an example of a non-transitory computer-readable storage medium 600 comprising computer-executable instructions which when executed by a processor 610 cause operation of an image processing system to: receive input image data 620 representative of at least a portion of an image comprising, the input image data comprising first input image data representing a first set of pixel locations associated with a first exposure level and second input image data representing a second set of pixel locations associated with a second, different, exposure level; generate first interpolated image data 630 associated with the first exposure level, the first interpolated image data 630 comprising a pixel intensity value for pixel locations in the second set; apply a noise model 640 to generate motion detection data based on differences between the second input image data and the first interpolated image data 630; and generate improved image data by combining data from the received first and second input image data in dependence on the motion detection data. The non-transitory computer-readable storage medium may any suitable storage medium for example, any of the storage mediums described in relation to FIG. 6.

The above examples are to be understood as illustrative examples. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
receiving input image data representative of at least a portion of an image, the input image data comprising first input image data representing a first set of pixel locations associated with a first exposure level and second input image data representing a second set of pixel locations associated with a second, different, exposure level;
generating first interpolated image data associated with the first exposure level, the first interpolated image data comprising pixel intensity values for pixel locations in the second set;
applying a noise model to generate motion detection data based on differences between the second input image data and the first interpolated image data; and
generating improved image data by combining data from the received first and second input image data in dependence on the motion detection data,
wherein generating improved image data comprises:
determining that the motion detection data is not indicative of motion being detected for a given pixel location; and
in response to said determining, combining the received first and second input image data to generate improved image data for the given pixel location, wherein combining the received first and second input image data to generate improved image data for the given pixel location comprises at least:
generating aligned image data by aligning the first input image data with the second input image data based on the exposure ratio;
determining whether the given pixel location is in a region representing a corner in the image; and
performing a predetermined action in response to the determination whether the given pixel location is in a region representing a corner in the image.

2. The method of claim 1, comprising generating second interpolated image data associated with the second exposure level, the second interpolated image data comprising a pixel intensity value for pixel locations in the second set, wherein applying a noise model to generate motion detection data is based on differences between the second input image data and the first interpolated image data and differences between the first input image data and the second interpolated image data.

3. The method of claim 1, wherein generating the motion detection data comprises generating a motion detection mask indicating at least one region of the image in which the image differs between the first input image data and the second image input data.

4. The method of claim 1, wherein applying a noise model to generate motion detection data based on differences between the second input image data and the first interpolated image data comprises:
smoothing the second input data for the second set of pixel locations; and
applying the noise model to generate motion detection data based on differences between the smoothed second input image data and the first interpolated image data.

5. The method of claim 1, wherein the first interpolated image data at a pixel location is generated based at least on first input image data representing neighboring pixel locations.

6. The method of claim 1, wherein applying the noise model to generate motion detection data based on differences between the second input image data and the first interpolated image data comprises:
aligning the first interpolated image data with the second input image data using an exposure ratio defining a ratio between the first exposure level and the second exposure level;
determining at least one difference between pixel intensity values of the aligned first interpolated image data with respective pixel intensity values of the second input image data; and
modifying the at least one difference according to the noise model.

7. The method of claim 1, wherein dependent on a determination that (i) the given pixel location is in a region representing a corner in the image, the predetermined action comprises using a portion of the aligned image data representing the given pixel location as the improved image data.

8. The method of claim 1, wherein dependent on a determination that (ii) the given pixel location is not in a region representing a corner in the image, the predetermined action comprises generating improved image data representative of the given pixel location by interpolating using the aligned image data.

9. The method of claim 8, wherein interpolating using the aligned image data comprises:

generating a first plurality of gradients, each gradient being associated with a direction from a plurality of directions and being dependent on the noise model;

generating a first plurality of interpolated values, at least some of the interpolated values being associated with directions from the plurality of directions; and combining the first plurality of interpolated values according to the first plurality of gradients to generate improved image data.

10. The method of claim 9, wherein the interpolated values of the first plurality of interpolated values are dependent on the exposure ratio.

11. The method of claim 10, wherein the interpolated values of the first plurality of interpolated values are generated by interpolating from aligned image data representing neighboring pixel locations, the aligned image data representing each neighboring pixel location being weighted according to a respective variance of said neighboring pixel location.

12. The method of claim 1, wherein determining whether the given pixel location is in a region representing a corner in the image comprises:

for each of a plurality of pixel regions comprising a plurality of pixel locations, the pixel regions surrounding and partially overlapping a central pixel region centered on the given pixel location, determining from the aligned image data a sum of absolute differences between pixel intensity values of pixel locations in each pixel region and respective pixel locations in the central pixel region, wherein the number of pixel locations in the central pixel region is equal to the number of pixel locations in each of the plurality of pixel regions;

comparing the sum of absolute differences from a pixel region having the lowest sum of absolute differences with an expected noise level at the given pixel location based on the noise model.

13. A method comprising:

receiving input image data representative of at least a portion of an image, the input image data comprising first input image data representing a first set of pixel locations associated with a first exposure level and second input image data representing a second set of pixel locations associated with a second, different, exposure level;

generating first interpolated image data associated with the first exposure level, the first interpolated image data comprising pixel intensity values for pixel locations in the second set;

applying a noise model to generate motion detection data based on differences between the second input image data and the first interpolated image data; and generating improved image data by combining data from the received first and second input image data in dependence on the motion detection data, wherein generating improved image data comprises:
determining that the motion detection data is indicative of motion being detected for a given pixel location; and in response to said determining, selecting one of the received first input image data and second input image data as a primary source of improved image data for the given pixel location, wherein when the given pixel location is not represented by the first or second input image data selected as a primary source, generating the improved input data for the given pixel location based upon the selected first or second input image data comprises:

generating a second plurality of gradients using the selected first or second input image data, each gradient of the second plurality of gradients being associated with a direction from the plurality of directions;

generating a second plurality of interpolated values using the selected first or second input image data, at least some of the interpolated values being associated with directions from the plurality of directions; and combining the second plurality of interpolated values according to the second plurality of gradients to generate improved image data.

14. The method of claim 13, wherein each gradient of the second plurality of gradients is dependent on the noise model.

15. A method comprising:

receiving input image data representative of at least a portion of an image, the input image data comprising first input image data representing a first set of pixel locations associated with a first exposure level and second input image data representing a second set of pixel locations associated with a second, different, exposure level;

generating first interpolated image data associated with the first exposure level, the first interpolated image data comprising pixel intensity values for pixel locations in the second set;

applying a noise model to generate motion detection data based on differences between the second input image data and the first interpolated image data; and generating improved image data by combining data from the received first and second input image data in dependence on the motion detection data, wherein generating improved image data comprises:
determining that the motion detection data is indicative of motion being detected for a given pixel location; and in response to said determining, selecting one of the received first input image data and second input image data as a primary source of improved image data for the given pixel location, wherein dependent on a determination that the given pixel location is positioned in a clipped region comprising at least one saturated pixel location, the saturated pixel location being associated with a higher exposure level of the first and second exposure levels, generating improved image data for the given pixel location comprises:

selecting the received first or second input image data associated with a lower exposure level of the first and second exposure levels.

* * * * *